(12) United States Patent  
Brauch (10) Patent No.: US 7,770,296 B2
(45) Date of Patent: Aug. 10, 2010

(54) OPTICAL SYSTEM AND METHOD OF CENTERING A TREE WITHIN A TREE SPADE

(76) Inventor: Richard L. Brauch, 624 W. Douglas Rd., Fort Collins, CO (US) 80524

( * ) Notice: Subject to any disclaimer, the term of this patent is extended or adjusted under 35 U.S.C. 154(b) by 133 days.

(21) Appl. No.: 11/951,886

(22) Filed: Dec. 6, 2007

(65) Prior Publication Data
US 2009/0144993 A1 Jun. 11, 2009

(51) Int. Cl.
G01B 11/26 (2006.01)
A01C 11/00 (2006.01)
A01G 23/04 (2006.01)

(52) U.S. Cl. .............................. 33/286; 33/520; 33/644; 111/101; 37/302

(58) Field of Classification Search .................. 33/286, 33/1 H, 276, 520, 521, 624, 644; 111/101; 37/302
See application file for complete search history.

(56) References Cited

U.S. PATENT DOCUMENTS

| | | | |
|---|---|---|---|
| 3,857,449 A | 12/1974 | Kimura | |
| 4,162,708 A | 7/1979 | Johnson | |
| 4,231,700 A | 11/1980 | Studebaker et al. | |
| 4,393,606 A | 7/1983 | Warnecke | |
| 5,081,941 A | 1/1992 | Weeks | |
| 5,129,336 A | 7/1992 | Vos | |
| 5,217,274 A | 6/1993 | Ilchuk | |
| 5,600,904 A | 2/1997 | Bowling | |
| 6,263,595 B1 | 7/2001 | Ake | |
| 6,493,951 B1* | 12/2002 | Smith et al. | 33/265 |
| 6,513,251 B2* | 2/2003 | Huang et al. | 33/286 |
| 6,561,108 B2* | 5/2003 | Fisher | 111/101 |
| 6,578,274 B1* | 6/2003 | Tango et al. | 33/1 G |
| 6,725,552 B2* | 4/2004 | Myron et al. | 33/286 |
| 6,796,038 B2* | 9/2004 | Humphries | 33/265 |
| 6,937,336 B2* | 8/2005 | Garcia et al. | 356/399 |
| 6,968,625 B2* | 11/2005 | Segerstrom et al. | 33/286 |
| 7,055,251 B1* | 6/2006 | Smith et al. | 33/1 H |
| 7,073,452 B1 | 7/2006 | Manke et al. | |
| 7,134,212 B2* | 11/2006 | Marshall et al. | 33/286 |
| 7,150,115 B2 | 12/2006 | Parker | |
| 7,178,250 B2* | 2/2007 | Nash et al. | 33/286 |
| 7,313,871 B2* | 1/2008 | Lines et al. | 33/365 |
| 7,497,018 B2* | 3/2009 | Hersey et al. | 33/286 |
| 2001/0045032 A1 | 11/2001 | Kleffner | |
| 2002/0088129 A1* | 7/2002 | Huang et al. | 33/286 |
| 2003/0095840 A1 | 5/2003 | Wang et al. | |
| 2006/0112581 A1 | 6/2006 | Nortmann et al. | |
| 2006/0196059 A1* | 9/2006 | Berto | 33/286 |
| 2006/0225310 A1 | 10/2006 | Koch | |
| 2006/0225898 A1 | 10/2006 | Pierce et al. | |
| 2007/0056174 A1* | 3/2007 | Bascom et al. | 33/286 |

* cited by examiner

Primary Examiner—Christopher W Fulton
(74) Attorney, Agent, or Firm—Paul M. Thompson; Cochran Freund & Young LLC (57) ABSTRACT

Disclosed are an optical system and method for centering a tree within a tree spade apparatus that is mounted to a vehicle. Typically, the center point of the tree spade is difficult to align with the axis of the trunk of the tree. The present embodiments describe a projected pattern of light incident upon the tree trunk that assists the operator of the tree spade in centering the spade around the tree without additional assistance.

25 Claims, 6 Drawing Sheets

OPTICAL SYSTEM AND METHOD OF CENTERING A TREE WITHIN A TREE SPADE

BACKGROUND OF THE INVENTION

When transplanting trees or shrubs from one location to another, digging the plant in preparation for moving is typically the most challenging part of the job. Mechanical tree spades are commonly used to remove and replant trees. A typical tree spade includes a number of blades mounted in a circular or square fashion to form a single large circumferential spade. Typically, a spade will contain four blades, but variations exist with anywhere from three to eight blades. The blades are typically driven hydraulically into the ground and collapsed around the root ball of the tree. The tree can then be lifted out of the ground and transported to a desired position.

A major difficulty with this procedure is the centering of the tree spade around the root ball both laterally and front to back. Proper centering on the root ball is important because it provides the least damage to the root system and the best chance for the tree to thrive in the replanted location. Current methods either involve additional personnel to guide the spade into position or rely on elaborate, expensive and complicated sensor mechanisms that produce analog or digital signals which must be processed and displayed in a meaningful manner.

SUMMARY OF THE INVENTION

An embodiment of the present invention may therefore comprise a system for centering a tree spade on a tree comprising: at least one illumination device aimed towards a central axis, the central axis that is approximately equidistant from a plurality of digging blades of the tree spade; and, an illumination beam that is projected from at least one illumination device that produces a visible light pattern on a portion of the tree when the illumination beam is incident on the portion of the tree, the light pattern that provides an indication to an operator of the tree spade of the orientation of a longitudinal axis of the tree to the central axis.

An embodiment of the present invention may also comprise a method of centering a tree spade on a tree comprising: projecting at least one beam of light aimed towards a central axis, the central axis that is approximately equidistant from a plurality of digging blades of the tree spade; placing the tree spade such that at least one beam of light is incident on a portion of the tree; producing a light pattern on a portion of the tree that is visible to an operator of the tree spade with at least one beam of light; and, positioning the central axis of the tree spade to the longitudinal axis of the tree based upon the orientation of the visible light pattern on the portion of the tree.

Additional objects, advantages, and novel features of the invention are set forth in part in the description that follows and others will become apparent to those skilled in the art upon examination of the following description and figures or may be learned by practicing the invention. To achieve the foregoing and other objects in accordance with the purposes of the present invention, as embodied, and broadly described herein,

BRIEF DESCRIPTION OF THE DRAWINGS

The accompanying drawings, which are incorporated in and form a part of the specification, illustrate the preferred embodiments of the present invention, and together with the written description and claims, serve to explain the principles of the invention. In the drawings:

DETAILED DESCRIPTION OF THE INVENTION

While this invention is susceptible to embodiment in many different forms, there is shown in the drawings and will be described herein in detail specific embodiments thereof with the understanding that the present disclosure is to be considered as an exemplification of the principles of the invention and is not to be limited to the specific embodiments described.

Figure 1:
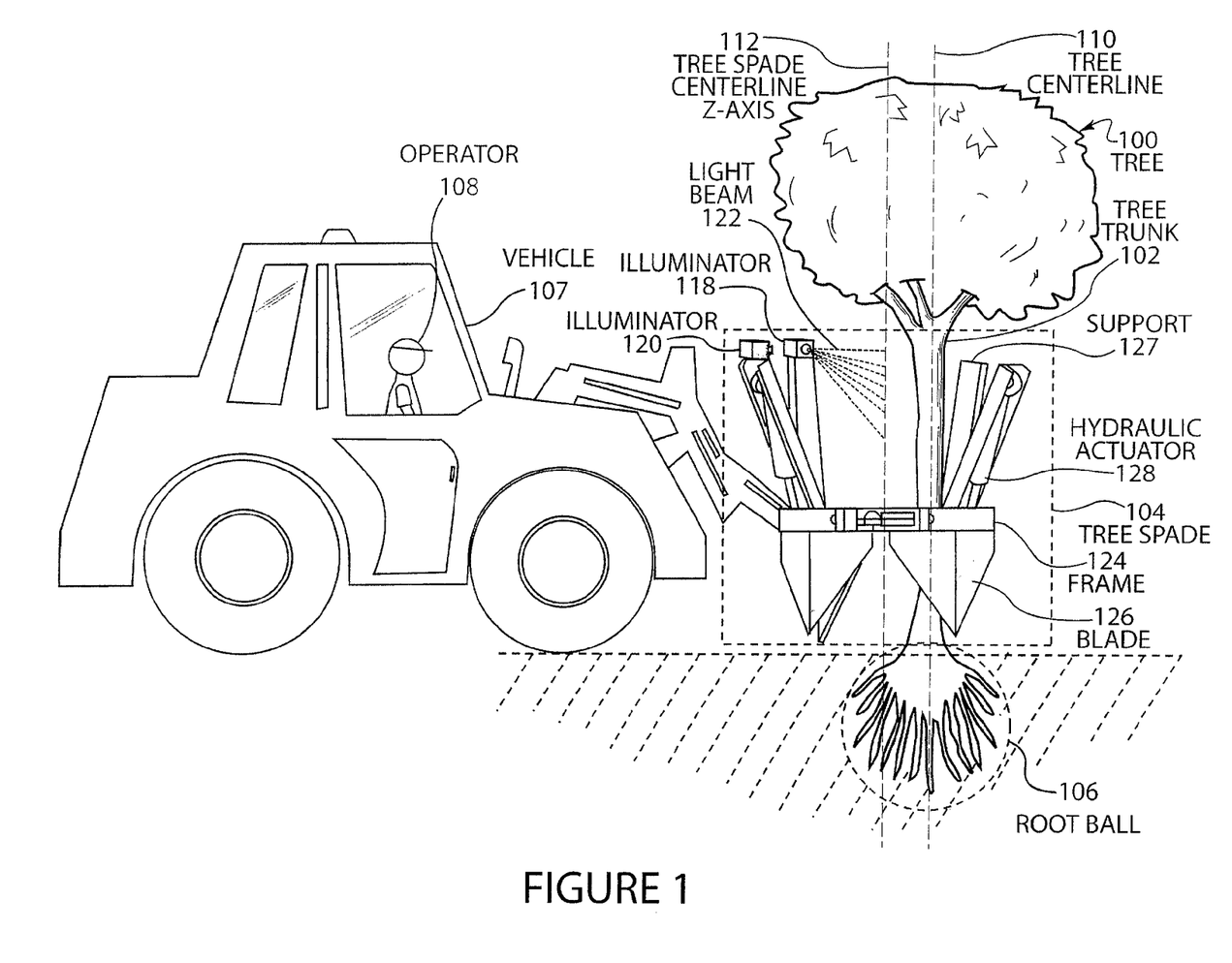
FIG. 1 illustrates an embodiment of an optical system for centering a tree within a tree spade.

FIG. 1 illustrates an embodiment of an optical system for centering a tree within a tree spade. As shown in FIG. 1, a tree 100 is to be dug up with a tree spade 104 that is mounted to a vehicle 107. This vehicle 107 may be a truck, a front-end loader, a skid loader or skid steer loader, an excavator, a backhoe, a mini loader, or any other type of earth moving equipment or any other vehicle upon which a mechanical tree spade may be mounted. Typically, the desired center point of the tree spade 104 is based on the central vertical axis or tree centerline 110 of the tree trunk 102 of the tree 100.

In this embodiment, the tree 100 to be transplanted is shown with a vertical tree centerline 110 that extends through the tree trunk 102 to the root ball 106 and is buried in the ground. In this instance, the tree spade comprises a plurality of blades 126 that are mounted within a frame 124. The blades 126 are typically driven into the ground from a perimeter position by hydraulic actuators 128 that are held in position by supports 127. When extended, the blades 126 separate a conical section of earth that encompasses the root ball 106 of the tree 100. The entire tree spade 104 is then lifted by the vehicle 107 and the tree 100 may then be transported and stored or transplanted in a new location.

The tree centerline 110 is ideally placed coincident to the tree spade centerline z-axis 112 in order to encompass as much of the root ball 106 as possible, and to limit the amount of root damage or root sheering that can occur if the blades 126 of the tree spade 104 are driven into the root ball 106. As can be seen from FIG. 1, if the tree spade 104 is not centered upon the tree trunk 102, and accordingly, the blades 126 of the tree spade 104 are not centered on the root ball 106, damage will occur to the root system of the tree 100 and the likelihood of survival upon transplantation is significantly decreased.

Because the tree trunk 102 is centered on the same axis as the root ball 106, the tree trunk 102 can be used as a reference for the positioning of the tree spade 104. Whereas this positioning has typically been performed either with a second person acting as a "spotter" to direct the positioning and operation of the vehicle 107 by an operator 108, or the operator 108 must leave the vehicle 107 (often multiple times) to verify the position of the tree spade 104 to the tree trunk 102 before digging. Both of these options are very time consuming, expensive and/or impractical.

The present embodiment utilizes a plurality of optical illuminators 118 and 120 which are positioned in relation to, and/or mounted upon the tree spade 104. These illuminators 118 and 120 produce an optical signal, i.e., a visible light beam 122, which provided an indication to the operator 108 that the tree spade 104 is centered upon the tree trunk 102, thereby also indicating that the tree centerline 110 is coincident with the tree spade centerline z-axis 112, and that the root ball 106 will be centered within the cone of earth defined by the extended blades 126. In this particular embodiment, a visible light source such as a commercially available laser generator, and in particular, multiple laser generators that produce a planar, fan shaped beam of light are utilized to project a pattern of light onto the tree trunk 102 that is visible to the operator 108 of the vehicle 107 that indicates that the tree spade 104 is in proper alignment with the tree 100 so that the root ball 106 may be extracted in an optimal fashion.

Figure 2:
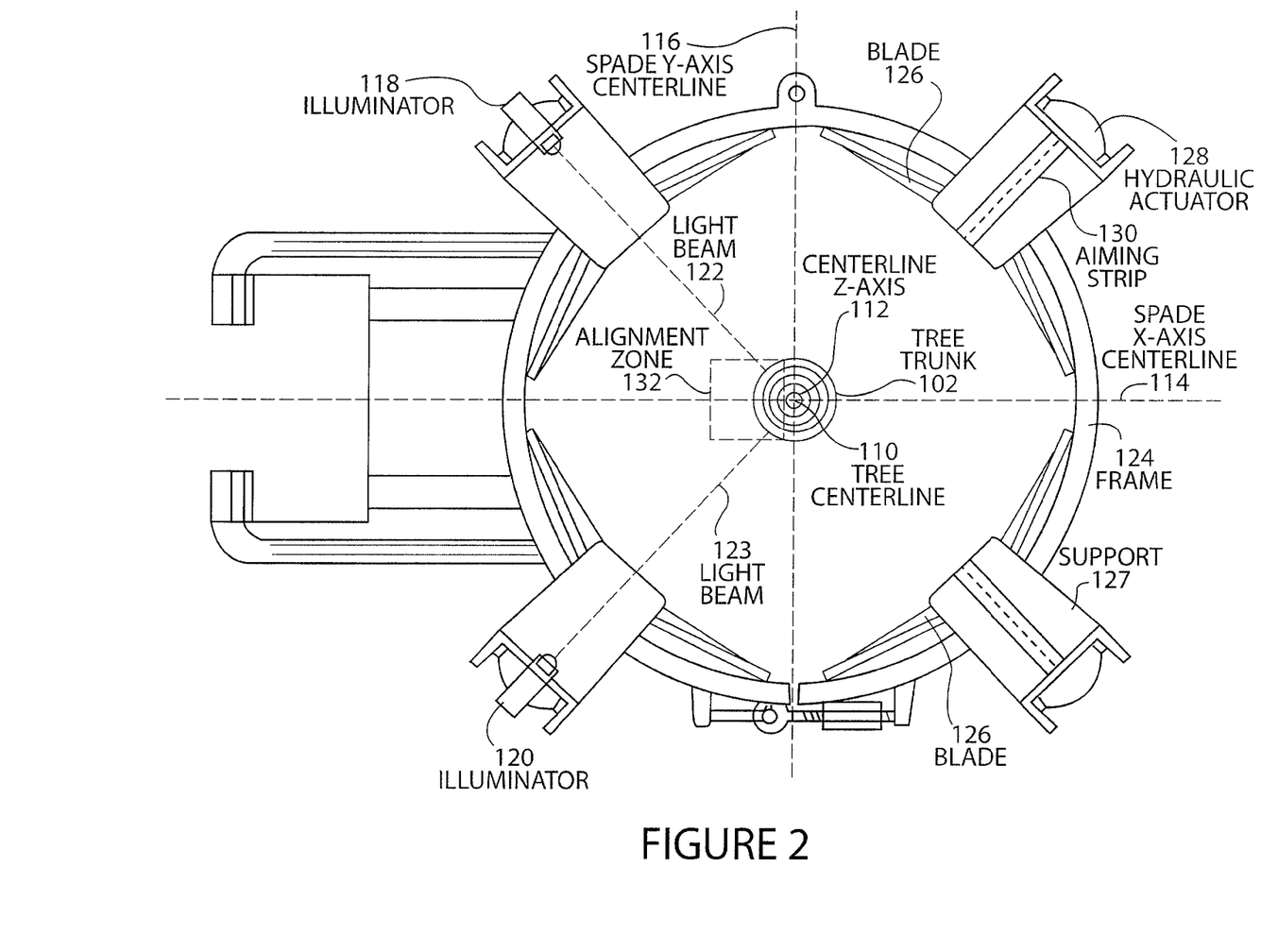
FIG. 2 illustrates a configuration of an embodiment of an optical system for centering a tree within a tree spade.

FIG. 2 illustrates a configuration of an embodiment of an optical system for centering a tree within a tree spade. As shown in FIG. 2 from a top view, a tree trunk 102 is to be dug up with a tree spade 104 (such as that shown in FIG. 1). In this particular embodiment, illuminator 118 is positioned on the upper portion of a left side support 127 of the hydraulic actuator 128 which provides the motive force to extend the blades 126 into the ground. A second illuminator 120 is positioned on the upper portion of a right side support 127. As can be seen in the diagram, the left and right illuminators 118 and 120 are positioned parallel to the horizontal plane of the tree spade (normal to the tree spade centerline z-axis 112), and project light beams 122 and 123 respectively which are directed towards the center of the tree spade, also depicted in FIG. 2 as the intersection of a spade y-axis centerline 116 and a spade x-axis centerline 114. By utilizing fan shaped beams of light which are directed such that the plane of each light beam 122 and 123 are coincident to the tree spade centerline z-axis 112. In this embodiment, the first illuminator 118 projects a first light beam 122 in a first plane and the second illuminator 120 projects a second light beam 123 in a second plane. The first plane and the second plane intersect along the tree spade centerline z-axis 112.

When the tree spade 104 is placed around the tree trunk 102, and the illumination devices are switched on, the light beams 122, 123 will each produce a line of light directed at the center of the spade. As the spade is moved into position, the beams will become incident upon the tree trunk and/or ground in front of the tree 100 to produce a pattern of lines on the tree trunk 102. For example, as the spade is positioned with the tree 100 near the center, the planar laser lines will show up on the tree trunk 102 in the alignment zone 132 and become visible to the operator 108. The operator 108 can then easily position the vehicle 107 (and thus the tree spade 104) by visual feedback on the tree trunk 102 as well as on the ground. The illuminators 118, 120 may also be positioned relative to the center of the tree spade 104 by using aiming strips 130 on the opposing supports 127. For example, the left illuminator 118 can easily be focused on an aiming strip 130 positioned on the right side support 127 while the right illuminator 120 can be focused on another aiming strip 130 positioned on the left side support 127 thereby intersecting the two beams along the centerline z-axis. By utilizing aiming strips 130 that are positioned the length of the support 127, the relative orientation of the light beams 122, 123 as well as the illumination devices 118, 120 can be readily adjusted and oriented.

Figure 3:
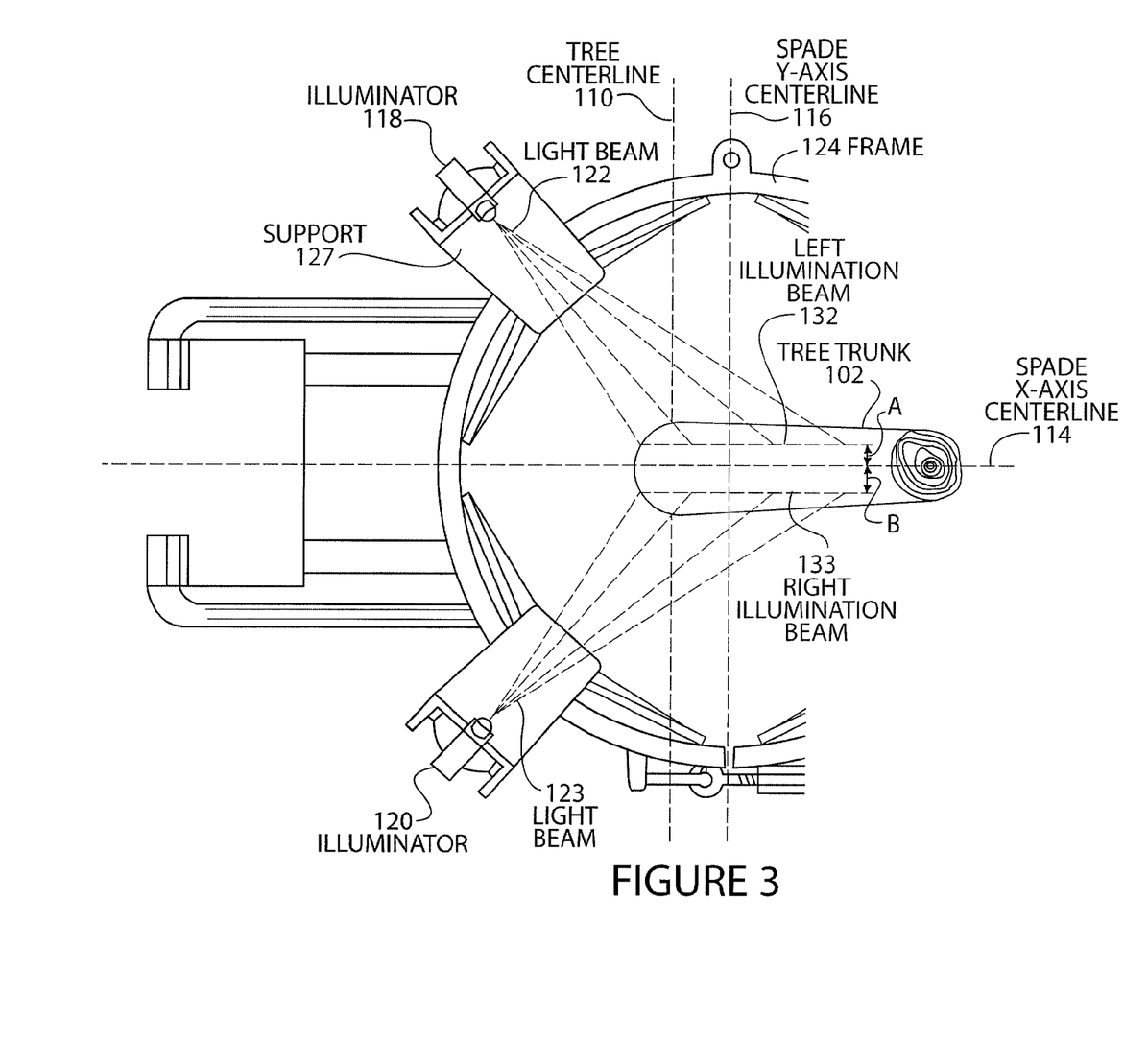
FIG. 3 illustrates a configuration of an embodiment of an optical system for centering a tree within a tree spade.

FIG. 3 illustrates a configuration of an embodiment of an optical system for centering a tree within a tree spade. As shown in FIG. 3 from a top perspective view, illuminator 118 projects a light beam 122 that is visible to an operator 108 of the tree spade 104. In this example, the light beam 122 is a planar laser beam that shows up as a left illumination beam 132 projected as a vertical line down the length of the tree trunk 102. Similarly, illuminator 120 projects a light beam 123 that is also visible to an operator 108 and also shows up as a right illumination beam 133 projected as a vertical line down the length of the tree trunk 102. If the front surface of the tree trunk 102 is illuminated by a just single line, the operator knows that this surface is at the intersection of the spade y-axis centerline 116 and the spade x-axis centerline 114. In order to then center the tree 100 within the tree spade 104, the operator would only have to position the single beam approximately in the center (left to right) of the tree trunk 102, and drive forward a distance approximately half the diameter of the tree trunk 102.

Additionally, the relative distance of the tree spade centerline z-axis 112 to the tree centerline 110 (typically the hardest distance for a tree spade operator to judge) is easily and readily determined by the relative distance of the left illumination beam 132 to the right illumination beam 133 depicted as A and B in FIG. 3. As the operator 108 drives toward the tree 100 the illumination beams 132, 133 (lines) will either be converging (distances A and B increasing), meaning that the tree is on the other side of center, or the illumination beams 132, 133 will be diverging (distances A and B decreasing), meaning that the tree is on the near side of center. With immediate feedback, the operator can quickly and easily place the tree trunk 102 in the center of the tree spade 104 without additional personnel or without leaving the vehicle.

Figure 4:
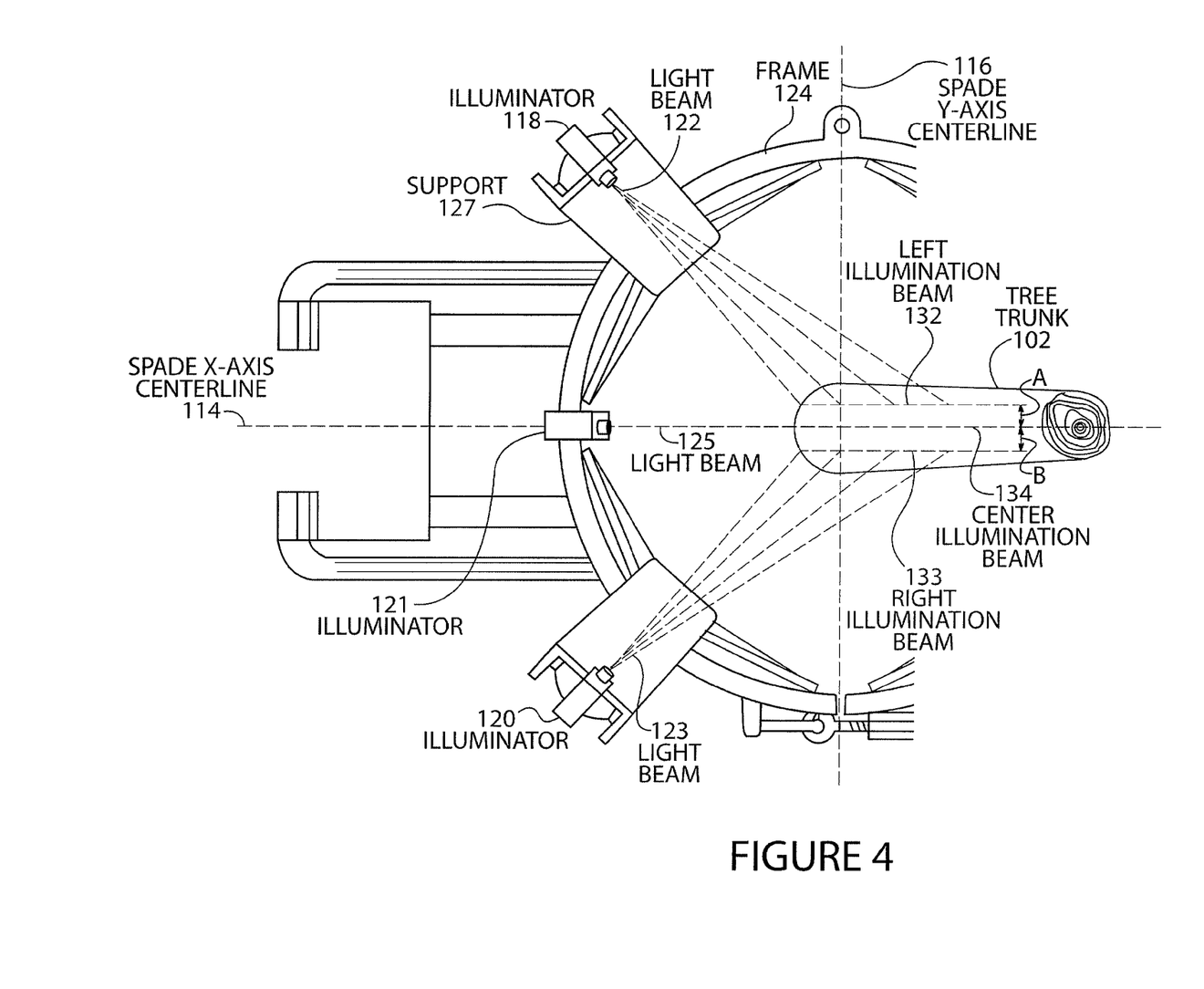
FIG. 4 illustrates a configuration of an embodiment of an optical system for centering a tree within a tree spade.

FIG. 4 illustrates a configuration of an embodiment of an optical system for centering a tree within a tree spade. As shown in FIG. 4 from a top perspective view, illuminator 118 projects a light beam 122 and illuminator 120 projects a light beam 123 that are visible to an operator 108 of the tree spade 104 in the same manner as FIG. 3. In this example, a third illuminator 121 projects a light beam 125 along the spade x-axis centerline 114. This beam is also visible to an operator 108 and can be projected as a vertical line down the length of the tree trunk 102 or as a single spot. In this manner, it may be easier for the operator to readily find the spade x-axis centerline 114. Additionally, the illuminators may project beams that are of different colors so that the operator 108 may have additional optical feedback to assist them in positioning the spade with respect to the tree 100. For example the left and right side illumination beams 130, 132 may utilize green laser light while the centerline illuminator 114 utilizes red laser light to produce a red center illumination beam 134.

Figure 5:
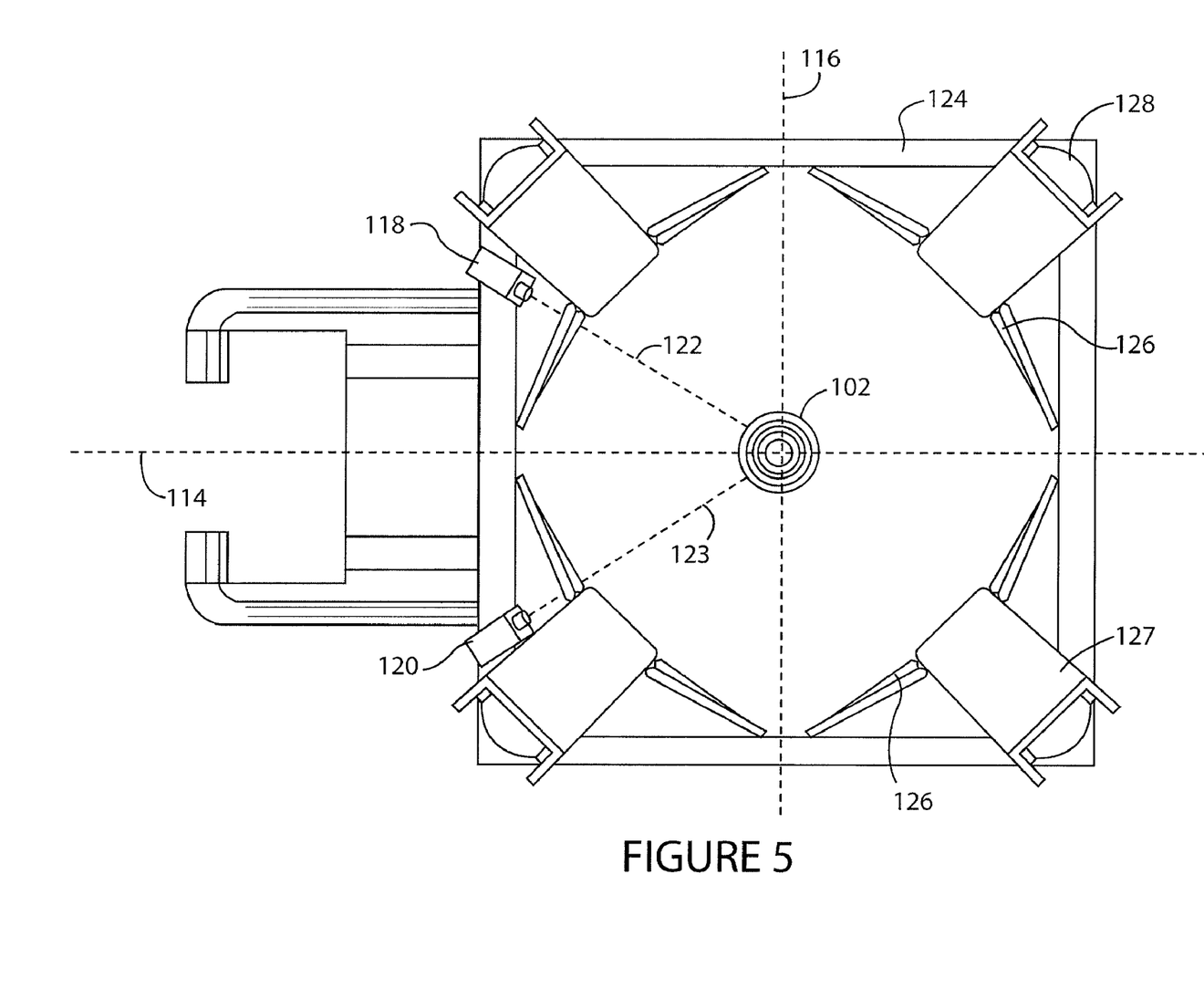
FIG. 5 illustrates another embodiment of an optical system for centering a tree within a tree spade.

FIG. 5 illustrates an additional configuration of an embodiment of an optical system for centering a tree within a tree spade. As is similarly shown in FIG. 3, FIG. 5 shows a top view of the system where the illuminators 118, 120 are mounted near the bottom portion of the tree spade 104. The frame 124 of the tree spade 104 in FIG. 5 is a square configuration and is positioned much lower to the ground in this particular spade. In this instance, the illuminators 118, 120 are mounted directly to the frame 124 and are not positioned directly on the diagonal (i.e., 45 degrees from the spade y-axis centerline 116 and the spade x-axis centerline 114). As long as the illuminators 118, 120 are symmetrically aligned with respect to the coordinate axis (x-y-z 114, 116, 112) of the tree spade, the principals of alignment and positioning are the same. With the illuminators 118, 120 placed on the lower portion of the tree spade 104, the shading provided by the tree 100 and spade itself allow the illumination to be seen with greater contrast. This ability to position the illuminators 118, 120 at various places within the system allows for greater versatility of the application.

For instance, the illumination system may be integrally designed into a tree spade as original equipment or the system may be applied as an aftermarket item that is readily adaptable to existing equipment. Likewise, the mounting of the components may be accomplished in a temporary manner with magnets, adhesives, hook and latch or temporary fasteners or the like, or the system can be permanently mounted by bolting, welding etc., with fine adjustment and aiming allowances. This versatility also allows the system to be used with a wide variety of spade devices and configurations. The system readily adapts to spades with varying numbers of blades and functions on front-mounted, rear-mounted and even non-vehicle mounted spades.

The powering of the illuminators 118, 120 can be by any means available at the site, such as dedicated, independent battery operation or the vehicle electrical system may be utilized. A simple switching mechanism, either wired or wireless can be adapted to wherever the operator is when performing digging operations. Typically, a simple on-off switch is positioned within the operator's compartment of the digging vehicle and illumination can be readily switched by the operator when needed. This switch can be a toggle type switch or can be a momentary switch to reduce power draw when the illumination is not needed.

Figure 6:
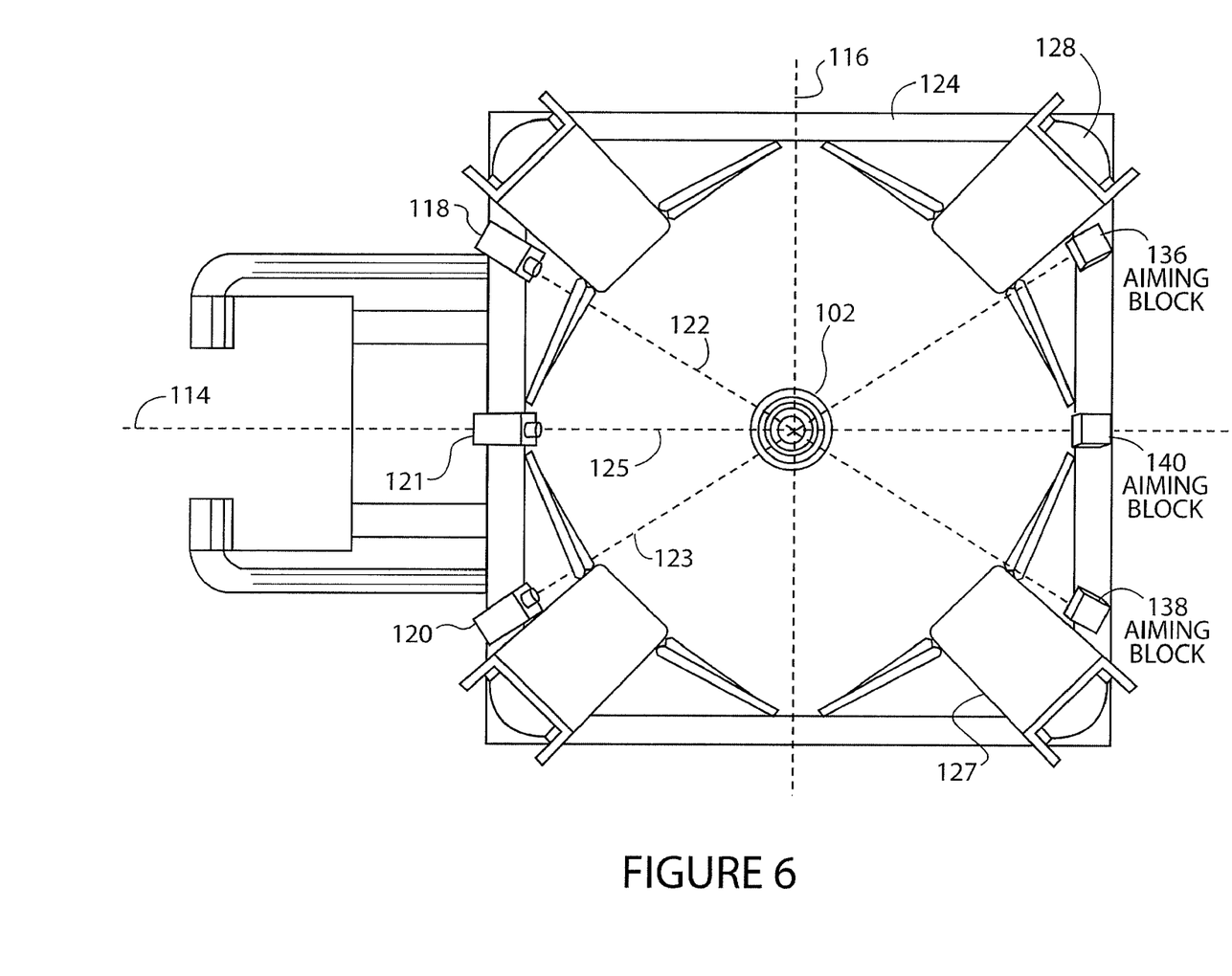
FIG. 6 illustrates a configuration of another embodiment of an optical system for centering a tree within a tree spade.

FIG. 6 illustrates a configuration of another embodiment of an optical system for centering a tree within a tree spade. As is similarly shown in FIG. 4, FIG. 6 shows a top view which describes a system where three illuminators 118, 120, 121 are mounted near the bottom portion of the tree spade 104. The frame 124 of the tree spade 104 in FIG. 6 is a square configuration and is positioned much lower to the ground in this particular spade. In this example, a third illuminator 121 projects a light beam 125 along the spade x-axis centerline 114. This beam is also visible to an operator 108 and can be projected as a vertical line down the length of the tree trunk 102 or as a single spot. The illuminators 118, 120, 121 in this embodiment may also be positioned relative to the center of the tree spade 104 by using aiming blocks 136, 138, 140 on the opposing side of the frame 124. For example, the left illuminator 118 can easily be focused on the right aiming block 138 while the right illuminator 120 can be focused on the left aiming block 136, and the center illuminator 121 can be focused on the center aiming block 140 thereby intersecting the three beams along the centerline z-axis. By utilizing aiming blocks 136, 138, 140 that are positioned, the frame 124, the relative orientation of the light beams 122, 123, 125, as well as the illumination devices 118, 120, 121 can be readily adjusted and oriented.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The embodiments of the invention in which an exclusive property or privilege is claimed are defined as follows:

1. A system for orienting a tree spade relative to a tree consisting essentially of:
    at least two illumination device aimed towards a central axis, said central axis that is approximately equidistant from a plurality of digging blades of said tree spade; and,
    an illumination beam that is projected from each said illumination device that produces a visible light pattern on a portion of said tree when each said illumination beam is incident on said portion of said tree, said light pattern that provides a visual indication to an operator of said tree spade of the orientation of a longitudinal axis of said tree to said central axis.

2. The system of claim 1, wherein at least one said illumination device is a laser generator.

3. The system of claim 2, wherein at least one said laser generator produces a planar, fan shaped beam of light.

4. The system of claim 1, wherein said at least two illumination devices is a plurality of laser generators mounted about the perimeter of said plurality of digging blades of said tree spade.

5. The system of claim 4, wherein said illumination beams of said plurality of laser generators intersects approximately at said central axis.

6. A method of orienting a tree spade relative to a tree comprising:
    projecting at least two beam of light aimed towards a central axis, said central axis that is approximately equidistant from a plurality of digging blades of said tree spade;
    placing said tree spade such that said at least two beams of light are incident on a portion of said tree;
    producing a light pattern on a portion of said tree that is visible to an operator of said tree spade with said at least two beams of light; and,
    positioning said tree spade relative to the longitudinal axis of said tree based upon the visual orientation of said visible light pattern on said portion of said tree.

7. The method of claim 6 further comprising the step of:
    projecting at least one said beam of light with a laser generator.

8. The method of claim 6 further comprising the step of:
    projecting at least one said beam of light with a laser generator, at least one said beam of light that is a planar, fan shaped beam.

9. The method of claim 6, further comprising the step of:
    projecting said at least two beams of light with a plurality of laser generators.

10. The method of claim 6, further comprising the step of:
    projecting said at least two beams of light with a plurality of laser generators mounted about the perimeter of said plurality of digging blades of said tree spade.

11. The method of claim 10, further comprising the step of:
    aiming said beams of light of said plurality of laser generators to intersect approximately at said central axis.

12. A system for orienting a tree spade relative to a tree consisting essentially of:
    a first illumination device aimed towards a central axis, said central axis that is approximately equidistant from a plurality of digging blades of said tree spade;
    a second illumination device aimed towards said central axis;
    a first illumination beam that is projected from said first illumination device that is approximately coincident to at least one point on said central axis;
    a second illumination beam that is projected from said second illumination device that is approximately coincident to at least one point on said central axis;
    a first visible light pattern that is produced on a portion of said tree when said first illumination beam is incident on said portion of said tree; and, a second visible light pattern that is produced on a portion of said tree when said second illumination beam is incident on said portion of said tree, said first and second visible light patterns that provides a visual indication to an operator of said tree spade of the orientation of said portion of said tree to said central axis.

13. The system of claim 12, wherein said first illumination device and said second illumination device are laser generators.

14. The system of claim 13, wherein said laser generators produce a planar, fan shaped beam of light.

15. The system of claim 14, wherein said beams of light from said laser generators intersect approximately at said central axis.

16. The system of claim 12, wherein said first illumination device and said second illumination device are mounted about the perimeter of said plurality of digging blades of said tree spade.

17. The system of claim 12 further comprising:
a first aiming receiver positioned on an opposing side of said central axis from said first illumination device that indicates proper alignment of said first illumination beam approximately through said central axis; and,
a second aiming receiver positioned on an opposing side of said central axis from said second illumination device that indicates proper alignment of said second illumination beam approximately through said central axis.

18. The system of claim 17 further comprising:
a third aiming receiver positioned on an opposing side of said central axis from said third illumination device that indicates proper alignment of said third illumination beam approximately coincident said x-axis centerline.

19. The system of claim 12 further comprising:
a third illumination device mounted on the x-axis centerline of said tree spade and aimed towards said central axis;
a third illumination beam that is projected from said third illumination device that is approximately coincident said x-axis centerline; and,
a third visible light pattern that is produced on a portion of said tree when said third illumination beam is incident on said portion of said tree, said third visible light pattern that provides a visual indication to an operator of said tree spade of the orientation of said portion of said tree to said x-axis centerline.

20. The system of claim 19, wherein said third illumination beam is a different color than said first and said second illumination beam.

21. A method of orienting a tree spade relative to a tree comprising:
projecting a first beam of light that is approximately coincident to at least one point on a central axis, said central axis that is approximately equidistant from a plurality of digging blades of said tree spade;
projecting a second beam of light that is approximately coincident to at least one point on said central axis;
placing said tree spade such that said first and second beam of light is incident on a portion of said tree;
producing a light pattern on a portion of said tree that is visible to an operator of said tree spade with said first and second beam of light; and,
positioning said central axis of said tree spade to the longitudinal axis of said tree based upon the visual orientation of said light pattern on said portion of said tree.

22. The method of claim 21 further comprising the step of:
projecting said first beam of light with a first laser generator;
projecting said second beam of light with a second laser generator.

23. The method of claim 21 further comprising the step of:
projecting said first beam of light with a first laser generator that is a first planar, fan shaped beam;
projecting said second beam of light with a second laser generator that is a second planar, fan shaped beam.

24. The method of claim 21 further comprising the step of:
projecting a third beam of light with a third laser generator that is approximately coincident said x-axis centerline to assist said operator in said positioning of said tree spade with respect to said x-axis centerline.

25. A system for orienting a tree spade relative to a tree consisting essentially of:
at least two illumination means aimed towards a central axis for producing a light pattern on a portion of said tree when said illumination means is incident on said portion of said tree, said central axis that is approximately equidistant from a plurality of digging blades of said tree spade, said light pattern that provides a visible indication to an operator of said tree spade of the orientation of a longitudinal axis of said tree to said central axis.

* * * * *